Oct. 2, 1956             R. SIEGEL            2,765,427
CONTROL AND DETECTING SYSTEM FOR USE IN CONJUNCTION
WITH A PLURALITY OF ELECTRIC CIRCUITS
Filed July 24, 1952
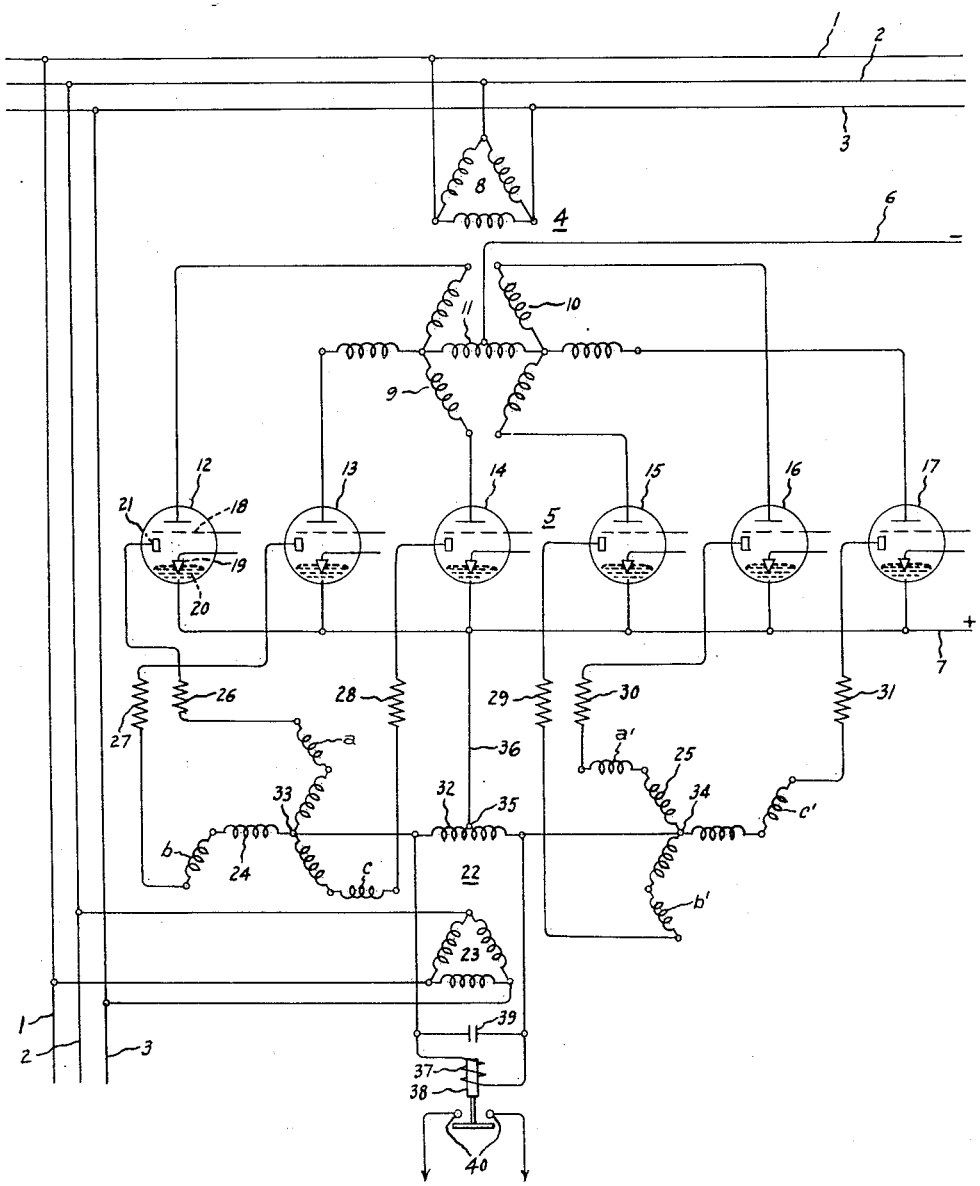
Inventor:
Ralph Siegel,
by    Burrell & Mack
His Attorney.

United States Patent Office 2,765,427
Patented Oct. 2, 1956

2,765,427

CONTROL AND DETECTING SYSTEM FOR USE IN CONJUNCTION WITH A PLURALITY OF ELECTRIC CIRCUITS

Ralph Siegel, Schenectady, N. Y., assignor to General Electric Company, a corporation of New York Application July 24, 1952, Serial No. 300,655

4 Claims. (Cl. 315—146)

This invention relates to control and detecting systems for use in conjunction with a plurality of electric circuits, and more particularly to misfire detecting control systems for a plurality of electric discharge devices connected in a single wave or half-wave polyphase circuit, such as is used, for example, for rectifying or converter purposes. The invention is applicable to electric discharge devices or valves in which current flow is by an electric discharge across a space in an evacuated envelope and in which current flow is initiated periodically by a control element. Such valves may be of the vacuum or so-called hard-tube type or might be of the gaseous discharge type such as an ignitron or a thyratron. The invention has been found to be particularly useful in valves of the ignitron type having a make-alive immersion ignition element and will be described in connection with an ignitron converter system.

During its operation an electric vapor discharge device of the make-alive type, such as an ignitron, may fail to conduct current because of a fault in the ignitor firing circuit or in one of the ignitors. Such failure to conduct current is commonly known as misfire. Failure may be occasional or persistent. Persistent excitation failure or misfire of an electric vapor discharge device results among other things in improper functioning of the system in such a way that reduced efficiency of operation is a result. In any case, an indication of faulty operation is desirable so that the fault may be remedied and normal operation continued. Various arrangements have been proposed or used heretofore for detecting misfires due, for example, to excitation failures or to leaks in the valve envelope in various types of vapor discharge devices. One such arrangement is disclosed in application Serial Number 238,541, Black, filed July 25, 1951, now Patent No. 2,678,318, and assigned to the assignee of this invention and incorporates a tuned relay circuit responsive to voltage impulses derived from each of a plurality of control circuits energized in rotation in accordance with energization of the associated valves so that upon failure of current to flow in one valve a reduced frequency component is supplied to the tuned relay circuit to cause operation thereof.

One object of this invention is to provide an improved misfire detecting system for single wave or half-wave electric valve systems wherein a single circuit element is arranged with portions common to each of a plurality of control circuits for the valves and wherein control means is responsive to signals derived from such single element so as to provide a system which is characterized by simplicity of construction and a high degree of reliability of performance as compared with prior art arrangements.

In carrying out the invention in one form as applied to a polyphase converter, a signal voltage of predetermined value is obtained from each discharge device during each half cycle of its operation, this voltage being zero during the half cycles in which the discharge device is not conducting. These signal voltages are derived by the control circuits for the various devices, the control circuits being arranged in two groups with the circuits of one group having a common connection point and with impedance means connected between the connection points. A tuned relay is energized by the voltage across the impedance means. Thus, during normal operation, a high frequency resultant voltage is produced in the relay circuit to which high frequency voltage the relay is not responsive. When one of the discharge devices fails to fire and its signal voltage consequently becomes zero, the resultant of the signal voltages has a low frequency component which effects operation of the relay to perform a control or indicating operation.

The invention will be better understood from the following detailed description taken in conjunction with the accompanying drawing in which the single figure thereof is a schematic representation of a single wave converter system embodying the invention.

In the drawing the numerals 1, 2 and 3 designate three conductors of a three phase alternating current system which is connected through the transformer arrangement generally designated by the numeral 4 and the electric valves connected in parallel and designated generally by the numeral 5 with the direct current circuit comprising the negative conductor 6 and the positive conductor 7.

The transformer generally designated by the numeral 4 comprises a mesh connected primary winding 8 which energizes a first star-connected secondary winding 9 and a second star-connected secondary winding 10. The neutrals of the star-connected windings 9 and 10 are interconnected by means of an interphase transformer 11 to the mid-tap of which is connected the negative conductor 6.

The three phases of the secondary windings 9 are respectively connected with the anodes of electric valves 12, 13, and 14, while the various phase windings of the transformer secondary winding 10 are interconnected with the anodes of valves 15, 16, and 17, respectively.

Each of the valves 12—17 is provided with a control grid 18, an ignitor 19 which is immersed in a mercury pool 20 which comprises the cathode of each valve. Circuits for energizing the grids 18 and ignitors 19 could be of the type disclosed in Mittag Patent 2,544,345, granted March 6, 1951 and as disclosed in Mulhern Patent 2,517,-129, granted August 1, 1950, both of which patents are assigned to the assignee of this invention. Since the particular circuits for controlling the elements 18 and 19 form no part of the present invention and are well known in the art, they have been omitted from the drawing for the sake of simplicity.

Generally speaking, a cathode spot is established on the mercury pools 20 by means of a pulse of current supplied through the associated igniter 19. This spot is maintained by means of a suitable auxiliary electrode commonly referred to as a holding anode for a sufficient period of time until the associated grid 18 becomes sufficiently positive to establish conduction through the valve, the holding anode being sufficiently positive relative to the cathode for this purpose for a portion of alternate half cycles. Auxiliary electrodes or holding anodes are represented in the drawing by the numeral 21.

Suitable energization is supplied to the holding anodes 21 by means of the transformer means generally designated by the numeral 22. The transformer means 22 comprises a mesh connected primary winding 23 which energizes a first star-connected secondary winding 24 and another star-connected secondary winding 25. For the purpose of establishing the correct phase relationship between the instant of energization of the holding anodes 21 and the cathode-anode energization period of the valves, the transformers a, b and c are interconnected with the respective phase windings of the transformer 24 in known manner and by the same token the transformer windings a', b' and c' are interconnected with the various phase windings of the secondary winding 25 in order to establish the correct phase relationship for the associated holding anode circuits relative to their respective cathode-anode circuits of the associated valves. From the description thus far it will be understood that the holding anodes 21 are energized in sequence in known manner so as to maintain the associated cathode spot for the necessary period of time until the control grid 18 is rendered positive to establish conduction through the associated valve.

For the purpose of limiting the magnitude of current which can flow through the holding anodes 21 and their associated circuits the resistors 26—31 are respectively arranged in series with the holding anodes.

Unlike the prior art arrangements and in accordance with this invention, the holding anode circuits described above are energized in two groups, one group being supplied with energy from the secondary winding 24 and the other group being energized from the secondary transformer winding 25. Furthermore, in accordance with the invention the neutrals of each of these secondary windings 24 and 25 each comprises a connection point which is common to each of the circuits of the group and the impedance means 32 is connected between the connection points 33 and 34, and a mid-tap 35 of the impedance 32 is interconnected by the conductor 36 with the positive terminal 7 which is interconnected with the cathodes of the valves 12—17. Thus, when the holding anode circuit of any of the valves 12—14 is energized, a pulse of current is caused to flow through the left-hand portion of the impedance 32 and when any one of the holding anodes of the valves 15—17 is energized a pulse of current is caused to flow through the right-hand portion of the impedance 32. In either case, current flows through the conductor 36 to the cathodes of the valves 12—17 and, as is explained in detail in the abovementioned application Serial No. 238,541, Black, a triple-frequency is established. According to the present invention this triple-frequency is caused to appear in the impedance means 32 so long as the holding anode circuit of each of the valves 12—17 is conducting current normally. Upon a failure of any one of the holding anodes to conduct current, a frequency component is established within the impedance means which is of a lower frequency than the above-mentioned triple frequency and which corresponds to the fundamental frequency of the polyphase system comprising conductors 1, 2, and 3. It will be understood that the impedance means 32 could be a linear or a non-linear reactor, an auto transformer, or a resistor. If a suitable value of resistance is utilized as the impedance means 32, the resistors 27—31 could be eliminated in accordance with one feature of the invention.

Since the frequency which appears across the impedance means 32 is substantially reduced when a misfire condition occurs in any one of the valves 12—17, it is only necessary to arrange suitable control or indicating means which responds to such a reduced frequency in order to perform a control or indicating operation upon the occurrence of a misfire. To this end, the control means in the form of relay winding 37 and its associated armature 38 together with the capacitor 39 are constructed so as to be tuned to the fundamental frequency of the polyphase system comprising conductors 1, 2, and 3. Thus, during normal conditions, the relay comprising elements 37 and 38 does not respond to the high frequency supplied thereto. However, when a misfire condition occurs the relay winding 37 elevates its armature 38 and thereby establishes contact between the fixed contacts 40 which in turn are arranged in known manner to perform a control or indicating operation.

It will be understood that the impedance means 32 could be constructed of two parts, i. e., with one part having one of its terminals connected to the connection point 34 and the other terminal connected directly to the conductor 7, whereas a second part could have one terminal connected to the connection point 33 and its other terminal connected to the conductor 7 and the result would be the same as is achieved with the arrangement shown in the drawing.

While I have shown and described particular embodiments of my invention, it will be obvious to those skilled in the art that various changes and modifications may be made without departing from the invention and I therefore intend in the appended claims to cover all such changes and modifications as fall within the true spirit and scope of the invention.

What I claim as new and desire to secure by Letters Patent of the United States is:

1. A control system for use in conjunction with two groups of electric valve devices of the make-alive cathode type energized in polyphase relation as components of a polyphase system to become conductive in rotation and each including a holding anode disposed within an enclosing envelope, said control system comprising a control circuit for each of said holding anodes, said control circuits being arranged in two groups corresponding to the groups of said devices and each group of circuits having a connection point common to all of the circuits of the group, inductive impedance means connected between said connection points and arranged so that at least a portion thereof conducts a current impulse corresponding to each conducting period of said devices and their associated control circuits, the frequency of the voltage produced in said inductive impedance means being normally a multiple of the fundamental frequency of the voltage of said system and being equal to said fundamental frequency upon failure of current to flow in any of said devices, and means connected to said impedance means and tuned to be responsive to said fundamental frequency for performing a control or indicating operation.

2. A control system for use in conjunction with two groups of electric valve devices of the make-alive cathode type energized in polyphase relation as components of a polyphase system to become conductive in rotation and each including a holding anode disposed within an enclosing envelope, said control system comprising a control circuit for each of said holding anodes, said control circuits being arranged in two groups corresponding to the groups of said devices with the circuits of each group energized by a different star-connected transformer winding having a neutral point, inductive impedance means connected between said neutral points and having a point intermediate its terminals connected to all of the cathodes of said valves so that at least a portion thereof conducts a current impulse corresponding to each conducting period of said devices and their associated control circuits, the frequency of the voltage produced in said inductive impedance means being normally a multiple of the fundamental frequency of said system and being equal to said fundamental frequency upon failure of current to flow in any of said devices, and means connected to said impedance means and tuned to be responsive to said fundamental frequency for performing a control or indicating operation.

3. A protective system for a polyphase electric valve converter of the type having two groups of make-alive valves wherein each valve is provided with an anode, a cathode, an auxiliary electrode circuit and a make-alive electrode for the cathode which is arranged to be supplied with periodic current impulses for establishing a cathode spot on the cathode, said system comprising two groups of control circuits, each circuit being normally traversed by a current impulse corresponding to a predetermined half cycle of one phase of a polyphase circuit and each group of circuits having a connection point common to all of the circuits of the group, inductive impedance means connected between said connection points and having a point intermediate its terminals connected to all the cathodes of said valves so that at least a portion thereof conducts a current impulse corresponding to each current impulse in each of said circuits, the voltage in said impedance means having a normal frequency which is a multiple of the fundamental frequency of the polyphase converter circuit and having a component at a frequency equal to said fundamental frequency in response to failure of a current impulse in any auxiliary electrode circuit, and means tuned to be responsive to said fundamental frequency for performing a control or indicating operation.

4. A protective system for a single wave polyphase electric valve converter of the type having two groups of make-alive valves wherein each valve is provided with an anode, a cathode, an auxiliary electrode circuit and a make-alive electrode for the cathode which is arranged to be supplied with periodic current impulses for establishing a cathode spot on the cathode, said system comprising two groups of control circuits each circuit being normally traversed by a current impulse corresponding to a predetermined half cycle of one phase of a polyphase circuit and each group of circuits having a connection point common to all of the circuits of the group, inductive impedance means connected between said connection points, a point intermediate the terminals of said impedance means being connected to the cathodes of said valves, the voltage in said impedance means having a normal frequency which is a multiple of the fundamental frequency of the polyphase converter circuit and having a component at said fundamental frequency in response to failure of a current impulse in any auxiliary electrode circuit, and means tuned to be responsive to said fundamental frequency for performing a control or indicating operation.

References Cited in the file of this patent

UNITED STATES PATENTS

| | | |
|---|---|---|
| 1,665,313 | Lewis | Apr. 10, 1928 |
| 1,722,097 | Kern | July 23, 1929 |
| 2,123,859 | Winograd | July 12, 1938 |